United States Patent [19]

Wallet

[11] Patent Number: 4,880,156
[45] Date of Patent: Nov. 14, 1989

[54] OIL COLLECTION AND DISPOSAL DEVICE

[76] Inventor: Steven A. Wallet, 14 Finch Run, Avon, Conn. 06001

[21] Appl. No.: 214,183

[22] Filed: Jul. 1, 1988

[51] Int. Cl.⁴ .............................................. F16N 31/00
[52] U.S. Cl. .................................... 232/43.1; 141/340; 184/1.5; 184/106
[58] Field of Search ............... 232/43.1; 184/106, 1.5; 141/340, 363, 364, 331

[56] References Cited

U.S. PATENT DOCUMENTS

| | | | |
|---|---|---|---|
| 4,054,184 | 10/1977 | Marcinko | 184/106 X |
| 4,099,598 | 7/1978 | Clinard | 184/106 |
| 4,524,866 | 6/1985 | Pollacco | 184/106 X |
| 4,697,670 | 10/1987 | Arruda | 184/106 X |
| 4,802,599 | 2/1989 | Hill | 184/106 X |

Primary Examiner—Robert W. Gibson, Jr.
Attorney, Agent, or Firm—McCormick, Paulding & Huber

[57] ABSTRACT

A device for collecting and disposing of used automotive motor oil comprising a rectangular pan having five discharge openings in a bottom wall. A central opening is surrounded by four corner openings and bosses are provided beneath the openings with threaded through openings therein. Empty plastic oil bottles are attached to the bosses and used oil is drained into the pan and hence into the bottles. Interconnecting grooves in the pan provide for distribution and equalization of oil flow to the bottles.

10 Claims, 3 Drawing Sheets

OIL COLLECTION AND DISPOSAL DEVICE

BACKGROUND OF THE INVENTION

Various devices are available for the collection and disposal of used motor oil. In recent years, however, public attention has turned to the environmentally sound and legal disposal of such motor oil and to devices for accomplishing these ends.

It is the general object of the present invention to provide a collection and disposal device which is inexpensive, convenient to use and conducive to the environmentally sound and legal disposal of motor oil.

SUMMARY OF THE INVENTION

In fulfillment of the foregoing object, a device for collecting and disposing of used automotive motor oil and the like is provided with a collection pan which has a substantially horizontal generally flat bottom wall bounded by a marginal generally upright integral side wall which defines a broad upwardly exposed opening for the free acceptance of downwardly discharged motor oil from the drain opening of an automotive engine or the like. The pan bottom wall has at least three and preferably five similar discharge openings in horizontally spaced relationship so as to accommodate a like number of plastic motor oil bottles therebeneath. The bottles are arranged in an upright attitude and in similarly horizontally spaced relationship so as to communicate respectively with the bottom wall discharge openings through their top openings. Thus, used oil is freely discharged through the openings in the pan bottom and into the plastic bottles. The horizontal spacing of the dishcharge openings and the bottles therebeneath is such that the bottles are capable of serving as legs for the pan and supporting the same horizontally and in stable relationship with and beneath an automotive oil drain opening. A means for detachably securing the bottles in position beneath the pan with their top openings respectively in communication with the pan bottom openings may comprise suitable bosses with threaded through openings for receiving and fitting the threaded top portions of the bottles.

Preferably, with five (5) bottles, a rectangular pan is provided with one discharge opening and bottle located centrally and with the remaining openings and bottles arranged in substantially equally circumaxially spaced relationship thereabout. Further, in the preferred form, interconnecting grooves are provided in the bottom wall of the pan so as to extend between each of the discharge openings. That is, the central opening is connected directly with each of the four outer or corner openings and each outer or corner opening is connected directly with adjacent outer or corner openings and indirectly with remaining openings. The grooves provide for the substantial equalization of oil flow to the several bottles and the pan may of course be lifted with the bottles attached and tilted slightly as required to equalize distribution of the last remaining oil among the several bottles. The bottles may thereafter be removed, capped and disposed of in an environmentally sound and legal manner as at a gas station etc. As will be apparent, new oil introduced to the engine will ordinarily require plastic bottles which, once emptied, can be used as replacement bottles attached to the bottom of the pan.

DETAILED DESCRIPTION OF PREFERRED EMBODIMENT

Figure 1:
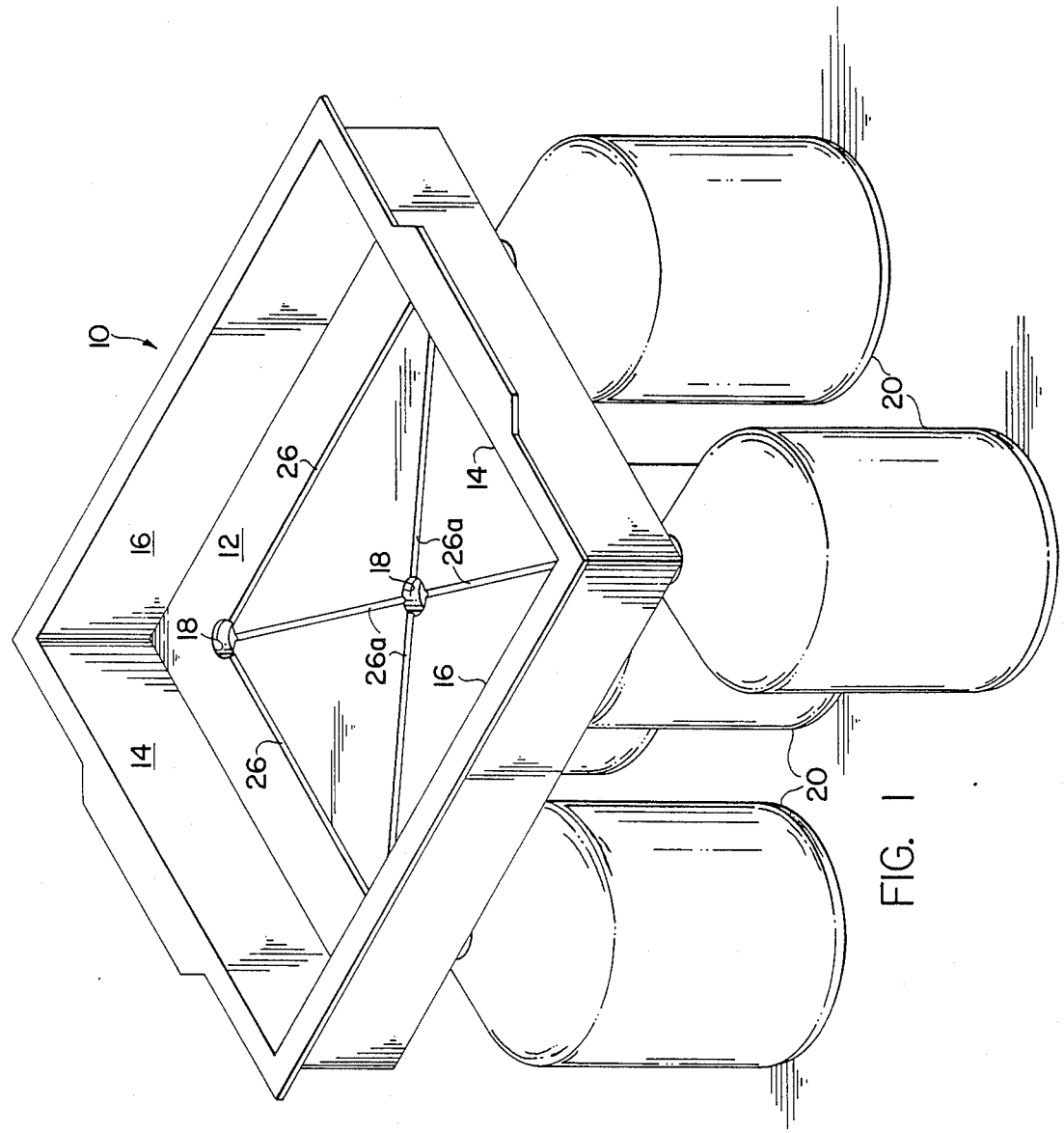
FIG. 1 is a perspective view of the oil collecting and disposing device of the present invention.

As best illustrated in FIG. 1, the oil collection and disposal device of the present invention, indicated generally at 10, comprises a generally flat bottom wall 12 which may be disposed in a horizontal plane. A side or marginal wall bounds the bottom wall and preferably takes the form of generally rectangular end sections 14,14 and side sections 16,16. While various forms of construction may of course be employed, a molded plastic construction is presently preferred.

Figure 3:
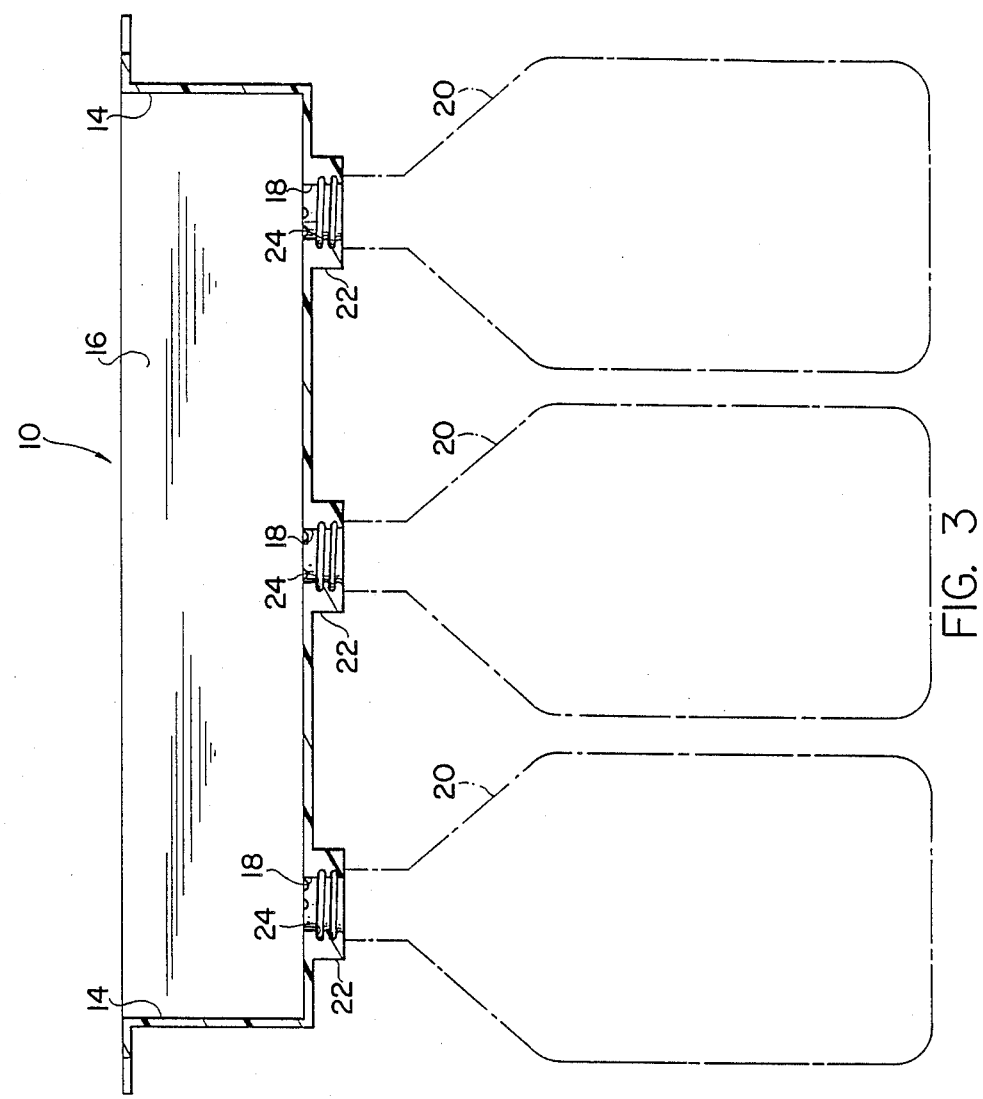
FIG. 3 is a vertical section taken generally as indicated at 3—3 in FIG. 2 and showing the collection and disposal device with plastic oil bottles therebeneath.

The bottom and side wall of the pan or receptacle provide a broad upwardly exposed opening for freely accepting the downward discharge of used motor oil from the drain opening of an automotive engine or the like. Used oil collected in the pan is discharged through at least three and preferably five similar discharge openings. Discharge openings 18,18 are arranged in horizontally spaced relationship so as to accommodate at least three and preferably five plastic motor oil bottles therebeneath. As best illustrated in FIG. 3, the bottles are arranged in upright attitude and in a spaced relationship similar to that of the discharge openings 18,18, typical bottles being shown in FIG. 3 at 20,20. The bottles 20,20 have their upper end portions in communication with the discharge openings 18,18 respectively so as to receive oil therefrom. Further, the horizontal spacing of the openings and bottles is such that the bottles are capable of serving as legs for the pan 10 and supporting the same horizontally and in a stable relationship with and beneath the drain plug opening of an automotive engine or the like.

As will be apparent, the bottles 20,20 are filled with used oil through the discharge openings 18,18 and must therefore be detachably secured in position. A means for detachably securing the bottles in position beneath the pan and with their top openings respectively in communication with the pan openings 18,18 may take the form of bosses 22,22. The bosses 22,22, best illustrated in FIG. 3, are provided with threaded through openings 24,24. The openings 24,24 receive and fit the threaded the upper end portions of the bottles 20,20 so that the bottles may be screwed in the position in a conventional manner for a fluid tight connection with the pan 10. When the used oil has been completely drained from the engine and when the bottles are filled with used oil, they may be removed from their position beneath the pan, the caps reapplied thereto, and the bottles may then be taken to a gas station or the like for proper disposal of the oil.

Figure 2:
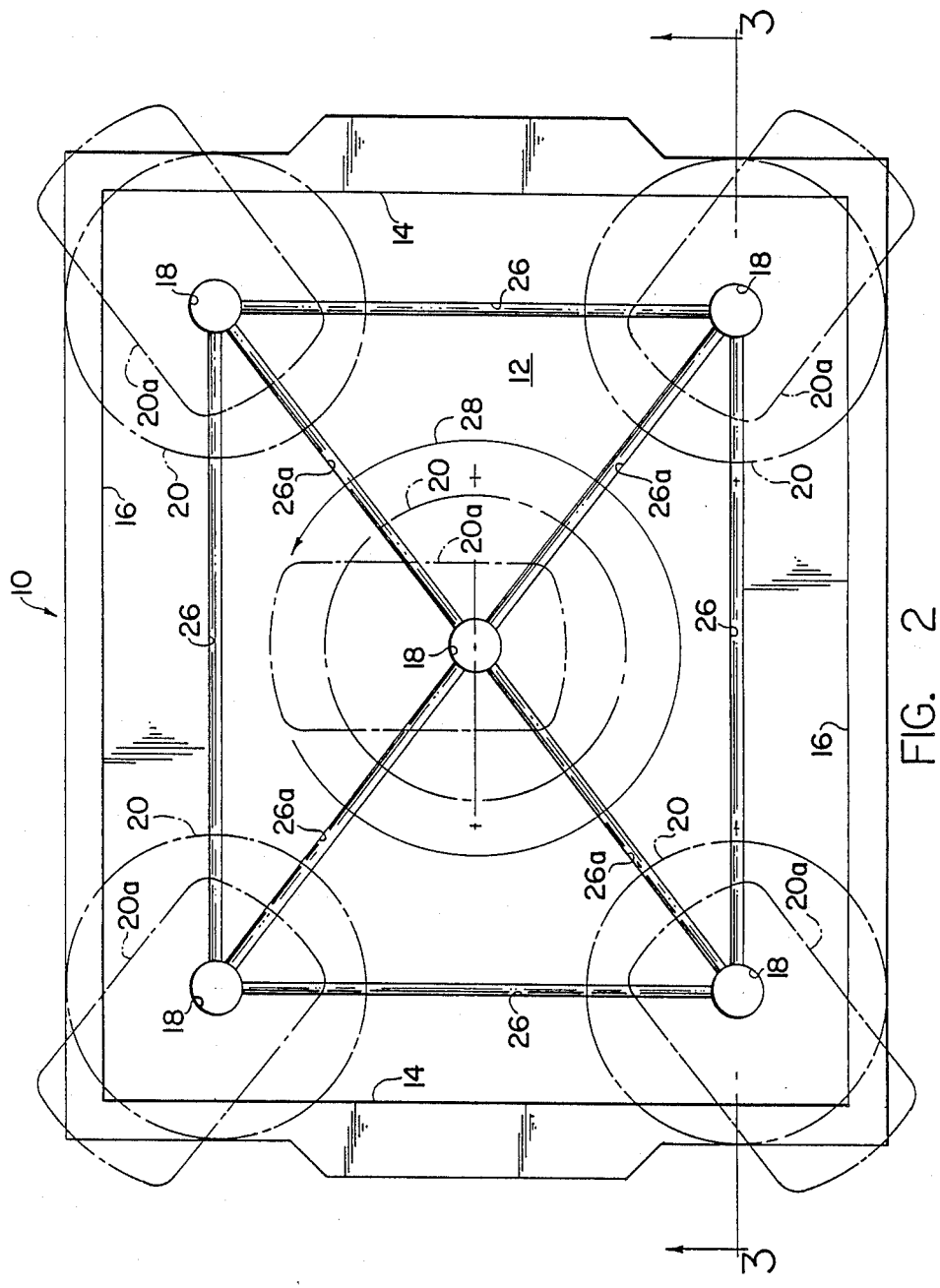
FIG. 2 is a top view of the device with empty plastic bottles connected at a bottom wall thereof.

Referring now to FIGS. 1 and 2 in particular, it will be observed that the bottom 12 of the pan 10 is provided with a series of grooves 26,26. The grooves 26,26 extend in a generally rectangular configuration to connect each of the openings 18,18 at outer or corner locations and a central opening 18 is connected by four grooves 26a,26a with the corner or outer openings 18,18. Thus, the central opening 18 is connected with each of the corner openings directly while the corner openings are connected with the central opening directly and with adjacent corner openings, the connection between each corner opening and opposite corner openings being indirect. As will be apparent, the grooves 26, 26a serve to equalize oil flow to the several bottles 20,20 disposed beneath the openings 18,18. In the event that such equalization is imprecise, it is of course possible to lift the pan and tilt the same slightly with the bottles attached. Proper tilting will result in a flow of oil to bottles which may have a slight remaining capacity and in equalization of the oil in all bottles. As mentioned, the bottles may then be removed, capped, and disposed of.

In FIG. 2, the broken lines 20,20 in circular form beneath each of the openings 18,18 represent a conventional cylindrical oil bottle. Rectangular oil bottles are also found in the marketplace and the rectangular broken lines at 20a,20a represent such bottles. As will be apparent, the spacing of the several discharge openings 18,18 in the bottom wall of the pan 10 is such as to accommodate both circular bottles 20 and rectangular bottles 20a. The arrow 28 depicts the revolution of a rectangular bottle relative to rectangular bottles 20a,20a positioned at the outer or corner discharge openings 18,18. Thus, the dimensions of the pan 10 are judiciously selected to provide minimum bulk and yet accommodate standard oil bottles found in the marketplace.

In use, the collection and disposal pan of the present invention may be positioned beneath the drain of an automotive engine. Five bottles are secured and positioned as illustrated in FIG. 3 and the pan is thus supported in a stable manner and in a generally horizontal plane. The oil drain plug is removed. Oil drains into the pan and the grooves in the pan distribute the oil to the plastic bottles. When the oil has been completely drained from the engine and collected in the bottles the bottles are removed from the pan and capped. New oil being introduced to the engine will ordinarily come to the customer in plastic bottles. Thus, an empty plastic bottle is attached to each of the bosses on the bottom of the oil pan and the pan is again ready for use. The used oil is then taken to a gas station or the like for proper disposal and the operation is complete.

I claim:

1. A device for collecting and disposing of used automotive motor oil and the like; said device comprising on oil collection pan having a horizontal and substantially generally flat bottom wall bounded by a marginal generally upright integral side wall defining a broad upwardly exposed opening for freely accepting the downward discharge of used motor oil from the drain opening of an automotive engine or the like, said pan bottom wall having at least three similar discharge openings in horizontally spaced relationship so as to accommodate three plastic motor oil bottles therebeneath in upright attitude and in similarly spaced relationship so as to communicate with and receive oil respectively from said discharge openings through their top openings, the horizontal spacing of said discharge openings and bottles being such that the bottles are capable of serving as legs for the pan and supporting the same horizontally in stable relationship with and beneath the drain plug opening, and a means for detachably securing the bottles in position beneath the pan with their top openings respectively in communication with said pan bottom openings as aforesaid.

2. A device for collecting and disposing of used automotive motor oil as set forth in claim 1 wherein horizontally spaced discharge openings are provided in said pan bottom wall, and wherein five plastic bottles are provided for cooperation therewith.

3. A device for collecting and disposing of used automotive motor oil as set forth in claim 1 wherein one of said discharge openings in said pan bottom wall is located approximately centrally and the remaining four openings are substantially equally spaced circumaxially thereabout.

4. A device for collecting and disposing of used automotive motor oil as set forth in claim 3 wherein said pan is substantially rectangular in configuration.

5. A device for collecting and disposing of used automotive motor oil as set forth in claim 2 wherein interconnecting grooves are provided in said bottom wall of said pan between said discharge openings, substantial equalization of oil discharge to the bottles thus being provided for.

6. A device for collecting and disposing of used automotive motor oil as set forth in claim 2 wherein each of said discharge openings is provided with an associated boss which depends from the bottom wall of the pan and which has a threaded opening therethrough in connection with its associated discharge opening, said threaded opening being adapted to receive the threaded top portion of a plastic motor oil bottle.

7. A device for collecting and disposing of used automotive motor oil as set forth in claim 6 wherein said discharge openings are horizontally spaced to accommodate both round and rectangular plastic motor oil bottles.

8. A device for collecting and disposing of used automotive oil as set forth in claim 6 wherein interconnecting grooves are provided in said bottom wall of said pan between said discharge openings, substantial equalization of oil discharge to the bottles thus being provided for.

9. A device for collecting and disposing of used automotive oil as set forth in claim 8 wherein each discharge opening is converted by said grooves directly with a centrally located opening and with two other adjacent openings and indirectly with the remaining discharge openings.

10. A device for collecting and disposing of used automotive oil as set forth in claim 9 wherein said pan is of unitary molded plastic construction.

* * * * *